(12) United States Patent
Zhao et al.

(10) Patent No.: US 11,465,152 B2
(45) Date of Patent: Oct. 11, 2022

(54) CRUSHING SYSTEM FOR LARGE-SIZE NATURAL GAS HYDRATE ROCK SAMPLES

(71) Applicant: SouthWest Petroleum University, Sichuan (CN)

(72) Inventors: Jinzhou Zhao, Sichuan (CN); Na Wei, Sichuan (CN); Chunquan Liu, Sichuan (CN); Kaisong Wu, Sichuan (CN); Liehui Zhang, Sichuan (CN); Shouwei Zhou, Sichuan (CN); Haitao Li, Sichuan (CN); Wantong Sun, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 548 days.

(21) Appl. No.: 16/604,100

(22) PCT Filed: Nov. 20, 2018

(86) PCT No.: PCT/CN2018/116452
§ 371 (c)(1),
(2) Date: Oct. 9, 2019

(87) PCT Pub. No.: WO2019/223264
PCT Pub. Date: Nov. 28, 2019

(65) Prior Publication Data
US 2020/0290052 A1    Sep. 17, 2020

(30) Foreign Application Priority Data

May 25, 2018 (CN) .......... 201810515840.X

(51) Int. Cl.
*G01N 3/22* (2006.01)
*B02C 1/00* (2006.01)
(Continued)

(52) U.S. Cl.
CPC .......... *B02C 1/005* (2013.01); *E21B 41/0099* (2020.05); *G01N 3/22* (2013.01);
(Continued)

(58) Field of Classification Search
CPC ....... B02C 1/005; E21B 41/0099; G01N 3/22; G01N 3/36; G01N 2203/0048; G01N 2203/0067; G01N 2203/0087
See application file for complete search history.

(56) References Cited

U.S. PATENT DOCUMENTS

| | | | | |
|---|---|---|---|---|
| 3,759,453 A | * | 9/1973 | Johnson | ................ B02C 2/045 241/207 |
| 3,964,719 A | * | 6/1976 | Hally | ................ B02C 21/02 241/223 |

(Continued)

FOREIGN PATENT DOCUMENTS

| | | |
|---|---|---|
| CN | 105044285 A | 11/2015 |
| CN | 204892035 U | 12/2015 |

(Continued)

*Primary Examiner* — Max H Noori
(74) *Attorney, Agent, or Firm* — Muncy, Geissler, Olds & Lowe, P.C.

(57) ABSTRACT

A crushing system for large-size natural gas hydrate rock samples, which mainly includes a crushing and stirring control subsystem, crushing and stirring execution subsystem and hydrate preparation subsystem. Full automatic control to parameter acquisition and experimental process is achieved by utilizing modern automation technology, including the function of automatically crushing the large-size natural gas hydrate rock samples and also monitoring, collecting and storing the drilling pressure, the torque and the internal furnace pressure and temperature parameters during the crushing process in real time, to provide reliable guarantee for the follow-up researches on crushing mechanism, crushing efficiency, drilling parameter optimization, rock crushing ability evaluation of a crushing tool and the (Continued)

like of the large-size natural gas hydrate rock samples and necessary experimental verification means for optimization of on-site exploiting construction conditions of natural gas hydrate.

6 Claims, 3 Drawing Sheets

(51) Int. Cl.
*E21B 41/00* (2006.01)
*G01N 3/36* (2006.01)
(52) U.S. Cl.
CPC ....... *G01N 3/36* (2013.01); *G01N 2203/0048* (2013.01); *G01N 2203/0067* (2013.01); *G01N 2203/0087* (2013.01)

(56) References Cited

U.S. PATENT DOCUMENTS

| | | | | |
|---|---|---|---|---|
| 4,210,292 A | * | 7/1980 | Livesay | B02C 1/00 241/264 |
| 5,697,562 A | * | 12/1997 | Leblond | B02C 13/2804 241/242 |
| 5,772,132 A | * | 6/1998 | Reid | B02C 21/02 241/101.74 |
| 5,967,431 A | * | 10/1999 | Stafford | B02C 1/10 241/300 |
| 6,446,892 B1 | * | 9/2002 | Fasoli | B02C 2/04 241/210 |
| 6,513,738 B1 | * | 2/2003 | Braun | B02C 2/045 241/207 |
| 2007/0029422 A1 | * | 2/2007 | Niemela | B02C 1/08 241/241.5 |
| 2007/0158479 A1 | * | 7/2007 | Westerman | B07B 1/005 241/101.74 |
| 2008/0203202 A1 | * | 8/2008 | Clark | B02C 13/09 241/197 |

FOREIGN PATENT DOCUMENTS

| | | | | |
|---|---|---|---|---|
| CN | 106840978 A | | 6/2017 | |
| CN | 106968674 A | | 7/2017 | |
| CN | 206513352 U | | 9/2017 | |
| CN | 108375660 A | * | 8/2018 | ............. G01N 33/00 |
| CN | 108827754 A | | 11/2018 | |
| CN | 214288469 U | * | 9/2021 | |
| CN | 215565772 U | * | 1/2022 | |
| CN | 215963953 U | * | 3/2022 | |
| JP | 2007147348 A | | 6/2007 | |

* cited by examiner

CRUSHING SYSTEM FOR LARGE-SIZE NATURAL GAS HYDRATE ROCK SAMPLES

TECHNICAL FIELD

The present invention relates to the technical field of researches on a crushing mechanism for large-size natural gas hydrate rock samples, in particular to a crushing system for large-size natural gas hydrate rock samples.

BACKGROUND

Natural gas hydrate is a non-stoichiometric cage crystal formed by water and natural gas in high pressure and low temperature environments, and is thus of a high-density and high-calorific-value unconventional energy source, mainly distributed in marine and terrestrial permafrost sediments, wherein the amount of marine natural gas hydrate resources is about one hundred times that of land tundra. Therefore, the natural gas hydrate is considered to be the most promising alternative energy source in the 21st century and is also the largest untapped new energy source.

In researches related to solid-state fluidized mining, mining equipment is a vital part of the study on natural gas hydrate fracture mechanism. The research on crushing mechanism directly affects the mining efficiency and mining cost of the subsequent natural gas hydrate solid-state fluidized mining process. Therefore, the research on the crushing mechanism of natural gas hydrate is an indispensable part of the research on natural gas hydrate solid-state fluidized mining. Most of the natural gas hydrates in nature are stored in the seabed in a solid-state form, are thus very difficult to mine. At present, indoor experimental research is an important means to mine marine natural gas hydrates. The natural gas hydrate is usually synthesized in a preparation kettle under high pressure and low temperature conditions in a laboratory, and the natural gas hydrate sample is stored in the preparation kettle in a solid-state form after being synthesized in the preparation kettle. However, how to crush natural gas hydrates under high pressure and low temperature conditions and how to acquire the relevant parameters of natural gas hydrate during the crushing process are of a major technical difficulty in the study on the crushing mechanism of large-size solid-state natural gas hydrate rock samples.

SUMMARY

Technical Problem

An objective of the present invention is to overcome the defects of the prior art and provide a crushing system for large-size solid-state natural gas hydrate rock samples, which is high in parameter acquisition precision, simple in structure, reliable in performance, convenient to operate and fully-automatic in control.

Solution of the Problem

Technical Solution

The objective of the present invention is realized by the following technical solution: a crushing system for large-size natural gas hydrate rock samples comprises a crushing and stirring control subsystem, a crushing and stirring execution subsystem and a hydrate preparation subsystem;

the crushing and stirring control system comprises a hydraulic station, a control cabinet, and a computer;

the crushing and stirring execution subsystem comprises a hydraulic cylinder, a hydraulic telescopic rod, a barrel body, a connecting block, a slider, a motor fixing frame, an electric motor, a speed reducer, a coupling, an axial supporting frame, a bearing pressure plate, a thrust bearing, a power short shaft, a universal joint, a torsion-tension-pressure transmitter upper connecting flange, a torsion-tension-pressure transmitter, a torsion-tension-pressure transmitter lower connecting flange, a crushing shaft centralizer, a dynamic sealing pressure plate, a dynamic seal assembly, a preparation kettle sealing disc, a seal ring, a crushing shaft, a preparation kettle, a crushing tool locking pin, a crushing tool, a large-size natural gas hydrate rock sample, a hydraulic oil inlet pipe and a hydraulic oil outlet pipe;

the hydrate preparation subsystem comprises a pressure transmitter, a temperature transmitter, a sliding rail, a seawater inlet valve, and a hydrate slurry outlet valve;

the hydraulic station is connected with the hydraulic cylinder through the hydraulic oil inlet pipe and the hydraulic oil outlet pipe; the hydraulic cylinder is fixedly disposed at the top end of the barrel body through the connecting block; the hydraulic telescopic rod is fixedly disposed in the hydraulic cylinder; the sliding rail is disposed on the inner wall of the barrel body, the slider is fixedly disposed on the motor fixing frame, and the slider is slidably connected with the sliding rail; the electric motor is fixedly mounted on the motor fixing frame and is connected with the speed reducer; the lower end of the hydraulic telescopic rod extends into the barrel body and is fixedly connected with the electric motor fixing frame; the preparation kettle is disposed at the bottom of the barrel body; the large-size natural gas hydrate rock sample is stored in the preparation kettle; the speed reducer is connected with the coupling; the lower end of the coupling is connected with the power short shaft; the axial supporting frame is fixedly connected with the electric motor fixing frame; the power short shaft is mounted on the axial supporting frame; the lower end of the power short shaft is connected with the universal joint through a universal joint upper locking pin; the lower end of the universal joint is connected with the torsion-tension-pressure transmitter upper connecting flange through a universal joint lower locking pin; the torsion-tension-pressure transmitter upper connecting flange is fixedly connected with the torsion-tension-pressure transmitter through an upper connecting bolt; the torsion-tension-pressure transmitter is connected with the torsion-tension-pressure transmitter lower connecting flange through a lower connecting bolt; the upper end of the crushing shaft is connected with the torsion-tension-pressure transmitter lower connecting flange through a torsion-tension-pressure transmitter lower locking pin; the lower end of the crushing shaft extends into the preparation kettle; the crushing shaft is fixedly connected with the crushing tool by a crushing tool locking pin; the hydraulic station, the computer, the torsion-tension-pressure transmitter and the electric motor are all connected with the control cabinet.

In a further preferred solution, the crushing shaft is fixedly mounted in the crusher shaft centralizer; the crushing shaft centralizer is fixed on the dynamic sealing pressure plate by a crushing shaft centralizer connecting bolt; the dynamic sealing pressure plate is fixed on the preparation kettle sealing disc by a dynamic sealing pressure plate bolt; the crushing shaft and the preparation kettle sealing disc are sealed by the dynamic seal assembly; and the preparation kettle sealing disc and the preparation kettle are sealed by the seal ring.

In a further preferred solution, the thrust bearing is mounted on the power short shaft; and the bearing pressure plate is fixedly mounted on the thrust bearing through a bearing pressure plate bolt.

In a further preferred solution, the pressure transmitter and a temperature transmitter are fixedly mounted on the preparation kettle and communicate with the interior of the preparation kettle; and the pressure transmitter and the temperature transmitter are connected with the control cabinet respectively.

In a further preferred solution, the preparation kettle is provided with the seawater inlet valve and the hydrate slurry outlet valve; the seawater inlet valve is mounted on the preparation kettle through a seawater inlet valve connecting bolt; the hydrate slurry outlet valve is mounted on the preparation kettle through a hydrate slurry outlet valve connecting bolt; and the seawater inlet valve and the hydrate slurry outlet valve are connected with the control cabinet respectively.

In a further preferred solution, the torsion-tension-pressure transmitter is connected with the control cabinet through a torsion-tension-pressure data acquisition line.

Beneficial Effects of the Invention

Beneficial Effects

The present invention realizes the full automatic control to parameter acquisition and experimental process by utilizing modern automation technology, thereby not only realizing the function of automatically crushing the large-size natural gas hydrate rock samples, but also monitoring, acquiring and storing the drilling pressure, the torque and the internal furnace pressure and temperature parameters during the crushing process in real time, so as to provide reliable guarantee for the follow-up researches on crushing mechanism, crushing efficiency, drilling parameter optimization, rock crushing ability evaluation on a crushing tool and the like of the large-size natural gas hydrate rock samples and necessary experimental verification means for optimization of on-site exploiting construction conditions of natural gas hydrate.

BRIEF DESCRIPTION OF THE DRAWINGS

Description of the Drawings

Figure 1:
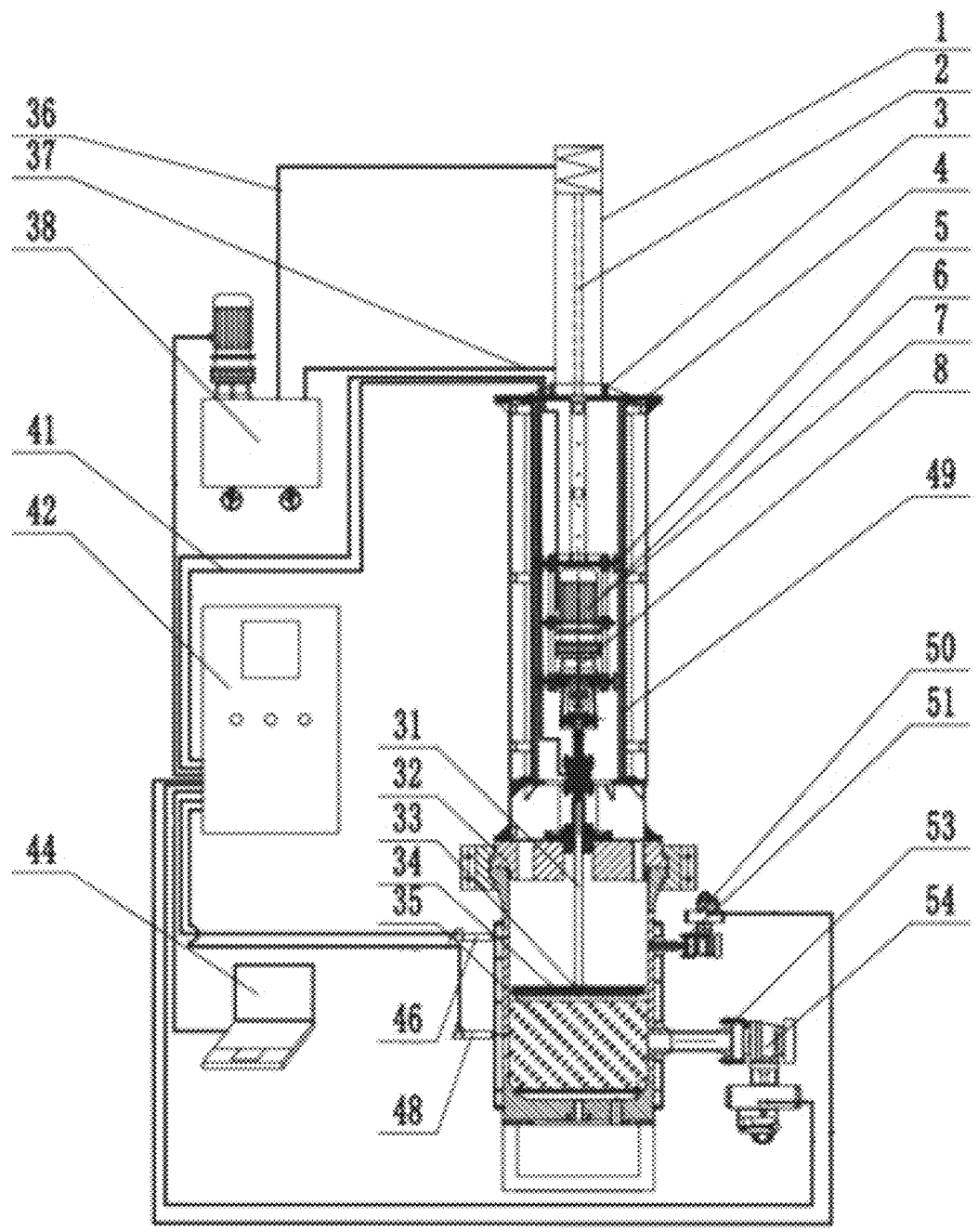
Figure 2:
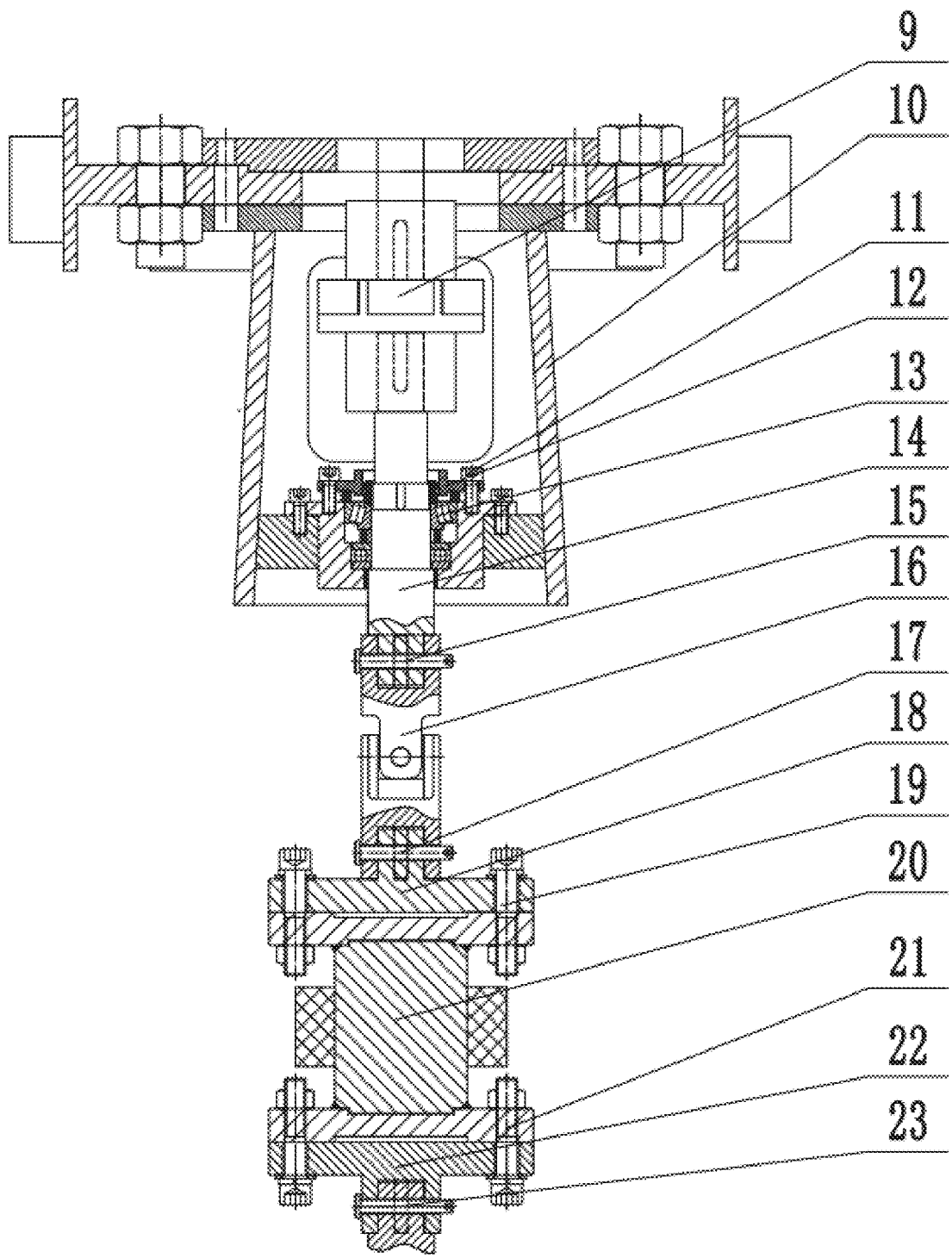
Figure 3:
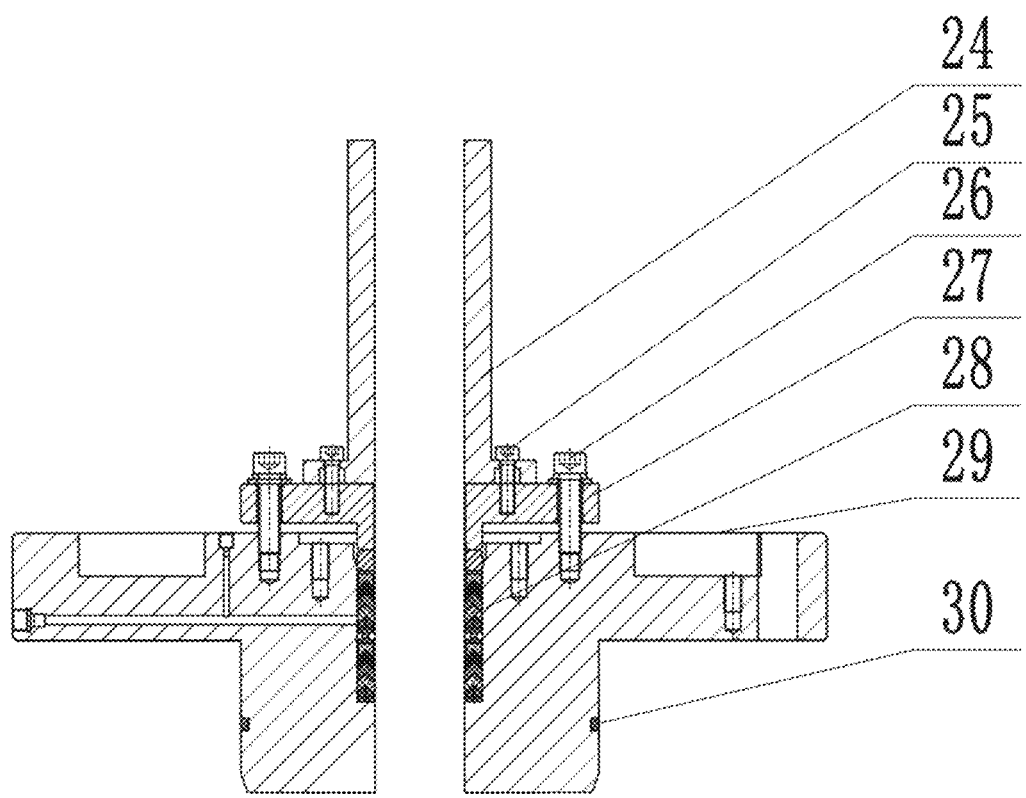

FIG. 1 is a schematic structural diagram of a crushing system for large-size solid-state natural gas hydrate rock samples of the present invention;

FIG. 2 is a schematic structural diagram of connecting components of the crushing system of the present invention;

FIG. 3 is a schematic structural diagram of a dynamic sealing and centralizing structure of a crushing and stirring rod of the present invention; and in FIGS. 1, 2 and 3, reference symbols represent the following components: 1—hydraulic cylinder; 2—hydraulic telescopic rod; 3—barrel body; 4—connecting block; 5—slider; 6—electric motor fixing frame; 7—electric motor; 8—speed reducer; 9—coupling; 10—axial supporting frame; 11—bearing pressure plate bolt; 12—bearing pressure plate; 13—thrust bearing; 14—power short shaft; 15—universal joint locking pin; 16—universal joint; 17—universal joint lower locking pin; 18—torsion-tension-pressure transmitter; 19—upper connecting bolt; 20—torsion-tension-pressure transmitter; 21—lower connecting bolt; 22—torsion-tension-pressure transmitter lower connecting flange; 23—torsion-tension-pressure transmitter lower locking pin; 24—crushing shaft centralizer; 25—crushing shaft centralizer connecting bolt; 26—dynamic sealing pressure plate bolt; 27—dynamic sealing pressure plate; 28—dynamic seal assembly; 29—preparation kettle sealing disc; 30—seal ring; 31—crushing shaft; 32—preparation kettle; 33—crushing tool locking pin; 34—crushing tool; 35—large-size natural gas hydrate rock sample; 36—hydraulic oil inlet pipe; 37—hydraulic oil outlet pipe; 38—hydraulic station; 41—torsion-tension-pressure data acquisition line; 42—control cabinet; 44—computer; 46—pressure transmitter; 48—temperature transmitter; 49—sliding rail; 50—seawater inlet valve; 51—seawater inlet valve connecting bolt; 53—hydrate slurry outlet valve connecting bolt; 54—hydrate slurry outlet valve.

EMBODIMENTS OF THE INVENTION

Detailed Description

The present invention will be further described below with reference to the accompanying drawings, but the protection scope of the present invention is not limited to the followings.

As shown in FIGS. 1-3, a crushing system for large-size natural gas hydrate rock samples comprises a crushing and stirring control subsystem, a crushing and stirring execution subsystem and a hydrate preparation subsystem, wherein the crushing and stirring control system comprises a hydraulic station 38, a control cabinet 42, and a computer 44;

the crushing and stirring execution subsystem comprises a hydraulic cylinder 1, a hydraulic telescopic rod 2, a barrel body 3, a connecting block 4, a slider 5, an electric motor fixing frame 6, an electric motor 7, a speed reducer 8, a coupling 9, an axial supporting frame 10, a bearing pressure plate 12, a thrust bearing 13, a power short shaft 14, a universal joint 16, a torsion-tension-pressure transmitter upper connecting flange 18, a torsion-tension-pressure transmitter 20, a torsion-tension-pressure transmitter lower connecting flange 22, a crushing shaft centralizer 24, a dynamic sealing pressure plate 27, a dynamic seal assembly 28, a preparation kettle sealing disc 29, a seal ring 30, a crushing shaft 31, a preparation kettle 32, a crushing tool locking pin 33, a crushing tool 34, a large-size natural gas hydrate rock sample 35, a hydraulic oil inlet pipe 36 and a hydraulic oil outlet pipe 37;

the hydrate preparation subsystem comprises a pressure transmitter 46, a temperature transmitter 48, a sliding rail 49, a seawater inlet valve 50, and a hydrate slurry outlet valve 54;

the hydraulic station 38 is connected with the hydraulic cylinder 1 through the hydraulic oil inlet pipe 36 and the hydraulic oil outlet pipe 37; the hydraulic cylinder 1 is fixedly disposed at the top end of the barrel body 3 through the connecting block 4; the hydraulic telescopic rod 2 is fixedly disposed in the hydraulic cylinder 1; the sliding rail 49 is disposed on the inner wall of the barrel body 3, the slider 5 is fixedly disposed on the electric motor fixing frame 6, and the slider 5 is slidably connected with the sliding rail 49; the electric motor 7 is fixedly mounted on the motor fixing frame 6 and is connected with the speed reducer 8; the lower end of the hydraulic telescopic rod 2 extends into the barrel body 3 and is fixedly connected with the electric motor fixing frame 6; the preparation kettle 32 is disposed at the bottom of the barrel body 3; the large-size natural gas hydrate rock sample 35 is stored in the preparation kettle 32; the speed reducer 8 is connected with the coupling 9; the lower end of the coupling 9 is connected with the power short shaft 14; the axial supporting frame 10 is fixedly connected with the electric motor fixing frame 6; the power short shaft 14 is mounted on the axial supporting frame 10; the lower end of the power short shaft 14 is connected with the universal joint 16 through a universal joint upper locking pin 15; the lower end of the universal joint 16 is connected with the torsion-tension-pressure transmitter upper connecting flange 18 through a universal joint lower locking pin 17; the torsion-tension-pressure transmitter upper connecting flange 18 is fixedly connected with the torsion-tension-pressure transmitter 20 through an upper connecting bolt 19; the torsion-tension-pressure transmitter 20 is connected with the torsion-tension-pressure transmitter lower connecting flange 22 through a lower connecting bolt 21; the upper end of the crushing shaft 31 is connected with the torsion-tension-pressure transmitter lower connecting flange 22 through a torsion-tension-pressure transmitter lower locking pin 23; the lower end of the crushing shaft 31 extends into the preparation kettle 32; the crushing shaft 31 is fixedly connected with the crushing tool 34 by a crushing tool locking pin 33; the hydraulic station 38, the computer 44, the torsion-tension-pressure transmitter 20 and the electric motor 7 are all connected with the control cabinet 42.

As a further embodiment of the present invention, the crushing shaft 31 is fixedly mounted in the crusher shaft centralizer 24; the crushing shaft centralizer 24 is fixed on the dynamic sealing pressure plate 27 by a crushing shaft centralizer connecting bolt 25; the dynamic sealing pressure plate 27 is fixed on the preparation kettle sealing disc 29 by a dynamic sealing pressure plate bolt 26; the crushing shaft 31 and the preparation kettle sealing disc 29 are sealed by the dynamic seal assembly 28; and the preparation kettle sealing disc 29 and the preparation kettle 32 are sealed by the seal ring 30; the thrust bearing 13 is mounted on the power short shaft 10; and the bearing pressure plate 12 is fixedly mounted on the thrust bearing 13 through a bearing pressure plate bolt 11; the pressure transmitter 46 and a temperature transmitter 48 are fixedly mounted on the preparation kettle 32 and communicate with the interior of the preparation kettle 32; and the pressure transmitter 46 and the temperature transmitter 48 are connected with the control cabinet 42 respectively; the preparation kettle 32 is provided with the seawater inlet valve 50 and the hydrate slurry outlet valve 54; the seawater inlet valve 50 is mounted on the preparation kettle 32 through a seawater inlet valve connecting bolt 51; the hydrate slurry outlet valve 54 is mounted on the preparation kettle 32 through a hydrate slurry outlet valve connecting bolt 53; and the seawater inlet valve 50 and the hydrate slurry outlet valve 54 are connected with the control cabinet 42 respectively; the torsion-tension-pressure transmitter 20 is connected with the control cabinet 42 through a torsion-tension-pressure data acquisition line 41.

The working process of the present invention is as follows.

In a drilling process: during the preparation of the large-size natural gas hydrate rock sample 35, the seawater inlet valve 50 and the hydrate slurry outlet valve 54 are both closed. After the preparation of the large-size natural gas hydrate rock sample 35 in the preparation kettle 32 is completed, according to the experimental requirements, a crushing mechanism of the large-size natural gas hydrate rock sample 35 is studied. First, an experimental operator sets a rotational speed value and a drilling pressure value of the electric motor 7 on the computer 44, and then the experimental operator issues a crushing instruction. The computer 44 assigns a crushing instruction to the control cabinet 42, and the control cabinet 42 transmits the instruction to the electric motor 7 and the hydraulic station 38, respectively. After the hydraulic station 38 receives the instruction, the hydraulic oil enters the hydraulic cylinder 1 from the hydraulic oil inlet pipe 36, and the hydraulic oil in the hydraulic oil cylinder 1 returns to the hydraulic station 38 through the hydraulic oil outlet pipe 37, thereby moving the hydraulic telescopic rod 2 downward. When the hydraulic telescopic rod 2 moves downward, the electric motor fixing frame 6 is pushed downward, and the electric motor fixing frame 6 and the slider 5 move downward along the sliding rail 49 under the thrust of the hydraulic telescopic rod 2. The electric motor 7 and the speed reducer 8 are fixed on the electric motor fixing frame 6, and move downward with the electric motor fixing frame 6. The speed reducer 8 and the coupling 9 are coupled together, causing the coupling 9 to move downward. The coupling 9 drives the power short shaft 14 to move downward. The power short shaft 14 transmits the drilling pressure to the universal joint 16 through the universal joint upper locking pin 15, and the drilling pressure on the universal joint 16 is transmitted to the torsion-tension-pressure transmitter upper connecting flange 18 through the universal joint lower locking pin 17. The torsion-tension-pressure transmitter upper connecting flange 18 transmits the drilling pressure to the torsion-tension-pressure transmitter 20. The torsion-tension-pressure transmitter 20 monitors and acquires a change in a drilling pressure during the movement process. The torsion-tension-pressure transmitter 20 transmits the drilling pressure to the crushing shaft 31 through the torsion-tension-pressure transmitter lower connecting flange 22. A lateral displacement of the crushing shaft 31 during the movement process is centralized by the crushing shaft centralizer 24, so that the crushing shaft 31 always rotates at the center of the preparation kettle 32, and the crushing shaft 31 moves downward to drive the crushing tool 34 to move downward. After the hydraulic station 38 receives an instruction from the control cabinet 42 to move the hydraulic telescopic rod 2 downward, the electric motor 7 starts to rotate according to a set rotational speed after receiving the instruction from the control cabinet 42. The electric motor 7 rotates to drive the speed reducer 8 and the coupling 9 to start to rotate, and the coupling 9 drives the power short shaft 14 to rotate. The power short shaft 14 transmits a rotational torque to the universal joint 16 through the universal joint upper locking pin 15. The rotational torque borne by the universal joint 16 is transmitted to the torsion-tension-pressure transmitter upper connecting flange 18 through the universal joint lower locking pin 17, and the torsion-tension-pressure transmitter upper connecting flange 18 transmits the torque to the torsion-tension-pressure transmitter 20. The torsional pressure transmitter 20 monitors and acquires the torque change during the rotation process, and the torsion-tension-pressure transmitter 20 transmits the torque to the crushing shaft 31 via the torsion-tension-pressure transmitter 22. The lateral displacement of the crushing shaft 31 during the rotation process is centralized by the crushing shaft centralizer 24, so that the crushing shaft 31 always rotates at the center of the preparation kettle 32. The crushing shaft 31 rotates to drive the crushing tool 34 to rotate, and the crushing tool 34 rotates to crush the large-size natural gas hydrate rock sample 35. As the crushing process progresses, the torsiontension-pressure transmitter 20 uploads the monitored and acquired real-time rock crushing parameters (torque, pressure, etc.) to the control cabinet 42 via the torsion-tension-pressure data acquisition line 41. The control cabinet 42 uploads the rock crushing parameters to the computer 44, and the computer 44 saves, analyzes and processes the uploaded data. The experimental operator can observe the rock crushing parameter data and the rock breaking parameter change trend in real time.

In a drilling pressure adjustment process: as the large-size natural gas hydrate rock sample 35 is crushed, the drilling pressure applied to the large-size solid natural gas hydrate rock sample 35 is reduced. The drilling pressure value monitored and acquired by the torsion-tension-pressure transmitter 20 is uploaded to the computer 44 via the torsion-tension-pressure data acquisition line 41 and the control cabinet 42. The computer 44 compares the uploaded data with a set value. After the comparative analysis, if it is found that the drilling pressure is reduced, the computer 44 automatically issues the control cabinet 42 an instruction to speed up the traveling speed of the hydraulic cylinder 1. After receiving the instruction, the control cabinet 42 issues the instruction to the hydraulic station 38. After receiving the instruction, the hydraulic station 38 speeds up the flow rates of the hydraulic oil inlet pipe 36 and the hydraulic oil outlet pipe 37, thereby speeding up the traveling speed of the hydraulic telescopic rod 2. The computer 44 performs repeated comparative analysis on data monitored and acquired by the torsion-tension-pressure transmitter 20, and repeats the drilling pressure adjustment process until the drilling pressure reaches the set value.

In a pulling-out process: when the crushing tool 34 drills to the bottom of the large-size natural gas hydrate rock sample 35, the computer 44 determines whether a final stroke has been reached based on displacement information. If it is determined that the final stroke has been reached, the computer 44 gives an alarm signal to indicate that the drilling process is completed, and the experimental operator gives the next instruction according to the experimental requirements. According to the experimental requirements, after the drilling is completed, the pulling-out process is performed, the experiment operator sends a pulling-out instruction to the computer 44, and the computer 44 transmits a pulling-out signal to the hydraulic station 38 through the control cabinet 42. The hydraulic oil flow in the hydraulic station 38 flows in from the hydraulic oil outlet pipe 37, and flows out of the hydraulic oil inlet pipe 36, thereby moving the hydraulic telescopic rod 2 upward. The hydraulic telescopic rod 2 pushes the electric motor fixing frame 6 upward, and the electric motor fixing frame 6 and the slider 5 move upward along the sliding rail 49 under the thrust of the hydraulic telescopic rod 2. The electric motor 7 and the speed reducer 8 are fixed on the electric motor fixing frame 6, and the motor 7 and the speed reducer 8 move upward with the electric motor fixing frame 6. The speed reducer 8 and the coupling 9 are coupled together, causing the coupling 9 to move upward. The coupling 9 drives the power short shaft 14 to move upward, and the power short shaft 14 transmits a pulling force to the universal joint 16 through the universal joint upper locking pin 15. The pulling force of the universal joint 16 is transmitted to the torsion-tension-pressure transmitter upper connecting flange 18 through the universal joint lower locking pin 17, and the pulling force is transmitted to the torsion-tension-pressure transmitter 20 by the torsion-tension-pressure transmitter upper connecting flange 18. The torsion-tension-pressure transmitter 20 monitors and acquires the change in tension during the rotation process, and the torsion-tension-pressure transmitter 20 transmits the tension to the crushing shaft 31 through torsion-tension-pressure transmitter lower connecting flange 22. The lateral displacement of the crushing shaft 31 during the movement process is centralized by the crushing shaft centralizer 24, so that the crushing shaft 31 always rotates at the center of the preparation kettle 32. The crushing shaft 31 drives the crushing cutter 34 to move upward, thereby realizing the pulling-out process.

In monitoring and acquisition of other parameters: in the drilling process, the drilling pressure adjustment process and the pulling-out process, in addition to the monitoring and acquisition of parameters such as drilling pressure, torque and tension, the pressure and temperature values in the preparation kettle 32 are acquired by the pressure transmitter 46 and the temperature transmitter 48, respectively. The data acquired by the pressure transmitter 46 and the temperature transmitter 48 are uploaded to the control cabinet 42. The control cabinet 42 then uploads the data to the computer 44. The computer 44 then analyzes, processes and stores the data, and the experiment operator can observe the pressure and temperature data in the preparation kettle 32 on the computer 44 in real time.

The above contents are only preferred embodiments of the present invention. It should be noted that a number of variations and modifications may be made by those common skilled in the art without departing from the concept of the present invention. All the variations and modifications should all fall within the protection scope of the present invention.

The invention claimed is:

1. A crushing system for large-size natural gas hydrate rock samples, comprising a crushing and stirring control subsystem, a crushing and stirring execution subsystem and a hydrate preparation subsystem, wherein the crushing and stirring control system comprises a hydraulic station, a control cabinet, and a computer;

the crushing and stirring execution subsystem comprises a hydraulic cylinder, a hydraulic telescopic rod, a barrel body, a connecting block, a slider, an electric motor fixing frame, an electric motor, a speed reducer, a coupling, an axial supporting frame, a bearing pressure plate, a thrust bearing, a power short shaft, a universal joint, a torsion-tension-pressure transmitter upper connecting flange, a torsion-tension-pressure transmitter, a torsion-tension-pressure transmitter lower connecting flange, a crushing shaft centralizer, a dynamic sealing pressure plate, a dynamic seal assembly, a preparation kettle sealing disc, a crushing shaft, a preparation kettle, a crushing tool locking pin, a crushing tool, a large-size natural gas hydrate rock sample, a hydraulic oil inlet pipe and a hydraulic oil outlet pipe;

the hydrate preparation subsystem comprises a pressure transmitter, a temperature transmitter, a sliding rail, a seawater inlet valve, and a hydrate slurry outlet valve;

the hydraulic station is connected with the hydraulic cylinder through the hydraulic oil inlet pipe and the hydraulic oil outlet pipe; the hydraulic cylinder is fixedly disposed at the top end of the barrel body through the connecting block; the hydraulic telescopic rod is fixedly disposed in the hydraulic cylinder; the sliding rail is disposed on the inner wall of the barrel body, the slider is fixedly disposed on the motor fixing frame, and the slider is slidably connected with the sliding rail; the electric motor is fixedly mounted on the electric motor fixing frame and is connected with the speed reducer; the lower end of the hydraulic telescopic rod extends into the barrel body and is fixedly connected with the electric motor fixing frame; the preparation kettle is disposed at the bottom of the barrel body; the large-size natural gas hydrate rock sample is stored in the preparation kettle; the speed reducer is connected with the coupling; the lower end of the coupling is connected with the power short shaft; the axial supporting frame is fixedly connected with the electric motor fixing frame; the power short shaft is mounted on the axial supporting frame; the lower end of the power short shaft is connected with the universal joint through a universal joint upper locking pin; the lower end of the universal joint is connected with the torsion-tension-pressure transmitter upper connecting flange through a universal joint lower locking pin; the torsion-tension-pressure transmitter upper connecting flange is fixedly connected with the torsion-tension-pressure transmitter through an upper connecting bolt; the torsion-tension-pressure transmitter is connected with the torsion-tension-pressure transmitter lower connecting flange through a lower connecting bolt; the upper end of the crushing shaft is connected with the torsion-tension-pressure transmitter lower connecting flange through a torsion-tension-pressure transmitter lower locking pin; the lower end of the crushing shaft extends into the preparation kettle; the crushing shaft is fixedly connected with the crushing tool by a crushing tool locking pin; the hydraulic station, the computer, the torsion-tension-pressure transmitter and the electric motor are all connected with the control cabinet.

2. The crushing system for large-size natural gas hydrate rock samples according to claim 1, wherein the crushing shaft is fixedly mounted in the crusher shaft centralizer; the crushing shaft centralizer is fixed on the dynamic sealing pressure plate by a crushing shaft centralizer connecting bolt; the dynamic sealing pressure plate is fixed on the preparation kettle sealing disc by a dynamic sealing pressure plate bolt; the crushing shaft and the preparation kettle sealing disc are sealed by the dynamic seal assembly; and the preparation kettle sealing disc and the preparation kettle are sealed by the seal ring.

3. The crushing system for large-size natural gas hydrate rock samples according to claim 1, wherein the thrust bearing is mounted on the power short shaft; and the bearing pressure plate is fixedly mounted on the thrust bearing through a bearing pressure plate bolt.

4. The crushing system for large-size natural gas hydrate rock samples according to claim 1, wherein the pressure transmitter and a temperature transmitter are fixedly mounted on the preparation kettle and communicate with the interior of the preparation kettle; and the pressure transmitter and the temperature transmitter are connected with the control cabinet respectively.

5. The crushing system for large-size natural gas hydrate rock samples according to claim 1, wherein the preparation kettle is provided with the seawater inlet valve and the hydrate slurry outlet valve; the seawater inlet valve is mounted on the preparation kettle through a seawater inlet valve connecting bolt; the hydrate slurry outlet valve is mounted on the preparation kettle through a hydrate slurry outlet valve connecting bolt; and the seawater inlet valve and the hydrate slurry outlet valve are connected with the control cabinet respectively.

6. The crushing system for large-size natural gas hydrate rock samples according to claim 1, wherein the torsion-tension-pressure transmitter is connected with the control cabinet through a torsion-tension-pressure data acquisition line.

* * * * *